(12) United States Patent
Lak et al.

(10) Patent No.: US 6,470,926 B1
(45) Date of Patent: Oct. 29, 2002

(54) ZERO GRAVITY LIQUID-VAPOR SEPARATION SYSTEM

(75) Inventors: Tibor Istvan Lak; Andrew Tibor Lak, both of Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/952,962

(22) Filed: Sep. 14, 2001

(51) Int. Cl.[7] ................................................ B65B 1/04
(52) U.S. Cl. ............................... 141/82; 165/59; 165/61
(58) Field of Search ............................... 141/1, 82, 98, 141/285, 289, 301; 165/59, 61, 65, 66

(56) References Cited

U.S. PATENT DOCUMENTS

| | | | | |
|---|---|---|---|---|
| 3,941,169 A | * | 3/1976 | Bassani | 141/61 |
| 4,922,973 A | * | 5/1990 | Keneavy | 141/11 |
| 5,476,537 A | | 12/1995 | Yi et al. | |
| 5,524,706 A | * | 6/1996 | Nakamura et al. | 165/108 |
| 5,540,058 A | | 7/1996 | Yi et al. | |

* cited by examiner

*Primary Examiner*—Steven O. Douglas
(74) *Attorney, Agent, or Firm*—Harness Dickey & Pierce P.L.C.

(57) ABSTRACT

A liquid-vapor separation system for use in a zero gravity environment for transferring and storing fluids, and particularly fluids that are primarily liquid, such as propellants, reactants and coolants, among others, has a low supply tank pressure and low pressurant gas requirement, which results in maximized capacity, reduced system weight and reduced cost. The temperature of a container provided as part of the present invention is decreased below the freezing point of residual liquid within the container. Non-compressible gas is thereafter vented and the liquid raised to liquid temperature. Gaseous contaminants are thereby vented and subsequent filling of the container is thereby maximized.

20 Claims, 3 Drawing Sheets

ZERO GRAVITY LIQUID-VAPOR SEPARATION SYSTEM

FIELD OF THE INVENTION

The present invention relates generally to fluid transfer systems, and more particularly to systems for transferring fluids in a zero gravity environment.

BACKGROUND OF THE INVENTION

In space (i.e., beyond the earth's atmosphere), the transfer of fluids, such as propellants and reactants, will be required to replenish space based propulsion and power generation systems. For example, re-supply of fuel to the International Space Station's (ISS) attitude propulsion system from a space shuttle may be provided. The ISS attitude propulsion system corrects for atmospheric drag and disturbances resulting from shuttle orbiter docking over the life of the space station. In addition to the ISS application, space based fuel storage depots with propellant transfer capability will be required to fuel reusable upper stages, as well as to fuel space based transfer vehicles in support of future human exploration and development of space (HEDS).

Fluid transfer, including for example, propellant and reactant transfer operation, requires reducing the pressure of a receiver tank through gaseous venting in order to achieve a high liquid fill level. Gaseous venting of a tank in a zero gravity space environment is difficult to achieve because the specific location of the liquid and vapor in the tank is typically not known. In order to provide gaseous venting in a zero gravity atmosphere, a separation of the liquid phase (i.e., liquid content) from the non-condensible pressurant gas (i.e., vapor) is required to prevent the loss of liquid propellant or reactant and maximize tank storage levels. In particular, liquid-vapor separation is needed to efficiently transfer and maximize storage of fluids, such as liquid propellants, in space.

Present liquid-vapor separation systems provide for propellant transfer in space using centrifugal force to separate the denser liquid phase from the lighter gas. The centrifugal force causes the liquid to move to the outside of a mechanism creating the force, where it is collected and returned to the tank, leaving the lighter gas in the center of the mechanism. The center gaseous core is subsequently vented outside the tank. These systems provide acceptable operation in low liquid quality applications (e.g., liquid droplets in vapor) wherein the majority of the volumetric flow is made up of gas. However, a centrifugal type system does not operate properly if the fluid comprises primarily a liquid. Further, in a zero gravity environment, problems arise in such systems, including the possibility of liquid phase moving to the vent line inlet, thereby making this type of liquid-vapor separation system ineffective.

Thus, a need exists for a liquid-vapor separation system for use in transferring fluids, and particularly fluids that are primarily liquid (e.g., propellants, reactants and coolants), in a zero gravity environment.

SUMMARY OF THE INVENTION

The present invention provides a system and method for separating the liquid and gaseous parts or phases of fluids (e.g., propellants, reactants and coolants), particularly fluids that are primarily liquid, in a zero gravity environment, through the freezing of the liquid phase. Generally, using a freezing process, liquid within a storage container (e.g., a tank) or similar device is caused to migrate to the storage container wall where the liquid is solidified. After the liquid is solidified, which is provided through the removal of heat from the storage container, non-condensible gas (e.g., pressurant gas) remaining in the storage container can be vented outside (i.e., to space) the storage container without loss of the liquid (e.g., frozen propellant, reactant and/or coolant). The present invention also provides for purging non-condensible gases from inside liquid acquisition screens and enables the filling of capillary devices with liquid.

Specifically, a zero gravity liquid-vapor separation system of the present invention is adapted for use in transferring and storing fluids, including for example, propellants that are primarily liquid, in a zero gravity environment. The zero gravity liquid-vapor separation system includes a heat exchanger for lowering the temperature of a container below a freezing point of a fluid (e.g., propellant, reactant and/or coolant) therein and a vent for use in removing non-condensible gas (e.g., pressurant) within the container when the fluid is below its freezing point.

Further, the heat exchanger may include a cooling loop with a radiator for cooling the fluid within the container, or, alternately, may include a plurality of louver type members for providing cooling. A diffuser may be used in combination with the vent for venting the container. A heater may be provided in combination with the container for heating the frozen fluid (e.g., frozen propellant, reactant and/or coolant) to a liquid temperature point after venting the non-condensible gas.

The present invention also provides a method of transferring a fluid (e.g., propellant, reactant and/or coolant) that is primarily or substantially liquid to a container having residual fluid therein in a zero gravity environment. The method includes lowering the temperature of the residual fluid below the freezing point of the residual fluid, venting the container to remove any non-frozen substances (e.g., non-condensible gases) remaining in the container, raising the temperature of the residual fluid to a liquid point of the residual fluid, and filling the container with additional fluid, such as, for example, a propellant.

Thus, the present invention provides a system and method for transferring a fluid (e.g., primarily liquid propellant, reactant and/or coolant) in a zero gravity environment, such that the storage capacity of the receiving container is maximized. Further, venting according to the present invention provides for removing dissolved gas containments from the liquid and results in a gas free liquid prior to filling or refilling the receiving container.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the application of the present invention as disclosed herein is directed to a system for transferring propellants, reactants and coolants in a zero gravity environment and described in connection with specific component parts for the particular application, it is not so limited, and other component parts and applications, including transfer and storage of different fluids are contemplated.

Generally, a zero gravity liquid-vapor separation system and method of providing the same constructed according to the principles of the present invention provides for the removal of heat from liquid residual inside a container (e.g., a tank), and subsequent venting of remaining non-compressible gas prior to container fill. Essentially, prior to fill operation, the temperature of a container, such as a tank (i.e., storage or receiver tank) is decreased (i.e., chilled) below the freezing point of liquid residual within the tank, and more preferably, substantially below the freezing point of the liquid residual, to insure that all of the liquid residual has solidified.

Thus, for example, storable propellants such as hydrazine, which has a freezing point of 32 degrees Fahrenheit and nitrogen tetroxide (NTO), which has a freezing point of 12 degrees Fahrenheit, a tank temperature of −50 degrees Fahrenheit is preferably provided to insure that liquid residuals are solidified. As another example, Monomehyl-hydrazine (MMH) has a freezing point of −63 degrees Fahrenheit and a tank temperature of preferably −100 degrees Fahrenheit is provided. It should be noted that because these temperature levels are relatively close to the freezing point of water, a simple Freon® cooling loop with a space radiator, cryocooler, or other device using cryogenic fluids, such as liquid nitrogen, helium, hydrogen, etc. may be used as described herein.

Figure 1:
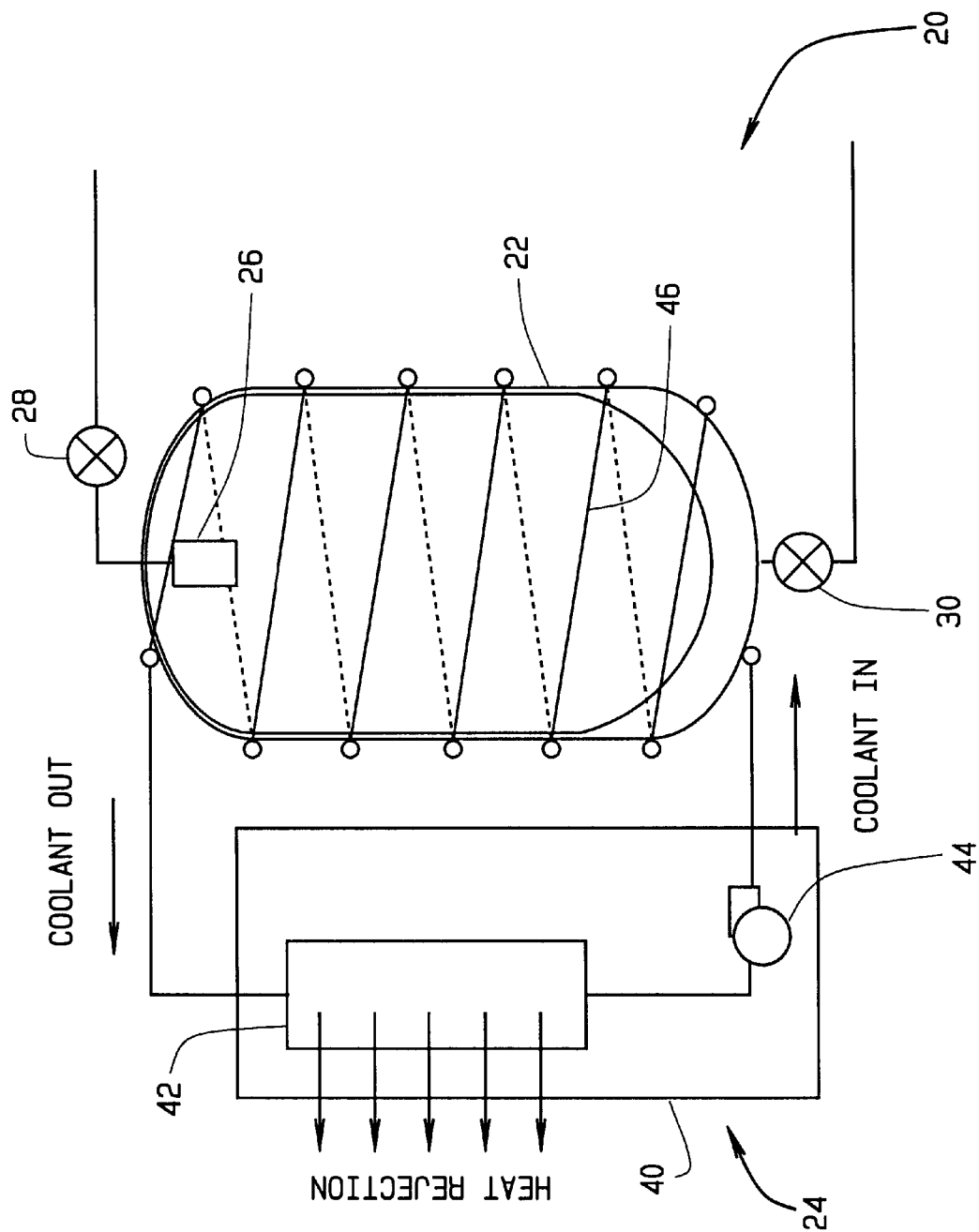
FIG. 1 is a schematic diagram of a zero gravity liquid-vapor separation system constructed according to the principles of the present invention.

Referring now specifically to FIG. 1, and an exemplary construction of a zero gravity liquid-vapor separation system, such a system is shown generally therein and indicated by reference numeral 20. The liquid-vapor separation system 20 provides for reducing the temperature of a container 22 (e.g., storage or receiver tank), or other suitable storage device, using a heat exchanger 24, which in this construction is provided external to the tank 22. As shown therein, the heat exchanger 24 includes a refrigeration system 40 having a radiator 42 that removes heat from a coolant (e.g., Freon®) traveling around the container 22, which may be provided using, for example, a recirculating pump 44. In particular, the recirculating pump 44 pumps the coolant through cooling lines 46, or other suitable fluid transfer member, provided on the external wall(s) of the container 22, to lower the temperature of the container 22 according to the present invention as described herein. Essentially, a closed loop refrigeration system is provided for cooling the container 22.

In operation, a micro gravity or zero gravity environment will cause residual liquid within the container 22 to contact the wall(s) of the container 22 and lowering the temperature of the wall(s) of the container 22 below the liquid freezing point temperature of residual liquid therein will cause the liquid residual to freeze and solidify to the container 22 wall(s). Thus, the freezing process results in solidified residual liquid, such as, for example, solidified propellant, reactant and/or coolant, among others, adhering to the container 22 wall(s).

During the liquid cool-down process resulting in the freezing of the residual liquid, dissolved non-condensible gas, such as a pressurant (e.g., helium, nitrogen, etc.) used to compress the fluid (e.g., propellant, reactant and/or coolant) in the container 22 will also separate out of the solution (e.g., pressurant separates from propellant) as the liquid temperature is lowered. It should be noted that the separation of non-condensible gas (i.e., out-gassing from the liquid) provides for the removal of dissolved gas contaminants from the liquid fluid, resulting in a liquid fluid that is gas free prior to the start of a fill operation. This out-gassing virtually eliminates the build-up of non-condensible gas inside the capillary screens of the container 22 and related storage system.

The container 22 as shown in FIG. 1 includes a diffuser 26, which in combination with a vent system having a vent valve 28, provides for venting of the non-condensible gas while the fluid in the container 22 is in a frozen state. Preferably, in order to prevent liquid fluid from freezing on the diffuser 26, which may prevent proper venting of the container 22, the diffuser 26 is thermally isolated from the container 22 and includes a heater (not shown) to maintain diffuser temperature above the liquid freezing point. It should be noted that the vent system may be provided in any suitable manner according to the requirements of the particular container 22 or system.

In operation in accordance with the present invention, the container 22 is preferably first chilled below the freezing point of residual fluid (i.e., liquid) within the container 22 using the heat exchanger 24. More preferably, the temperature of the container 22 is reduced to a level substantially below the freezing point of the residual fluid (i.e., liquid) therein. Following chill-down of the container 22 to a temperature below the freezing point of residual fluid (e.g., propellant, reactant and/or coolant) therein, venting of the container 22 using the vent valve 28 is provided. Essentially, the vent valve 28 is operated from a closed to an open position to allow venting of non-compressible gas to the atmosphere (e.g., space). It should be noted that because the liquid residual is solidified and remains attached to the container 22 wall, the pressure level of the container 22 can be reduced to space vacuum. Further, the elimination (i.e., a purging and venting) of all of the non-condensible gas (e.g., pressurant) from the container 22 prevents potential gas accumulation inside the liquid acquisition screen channels. Purging of gas from the liquid acquisition system provides proper subsequent liquid re-fill of the zero gravity surface tension acquisition system.

After completion of the venting process (i.e., removal of non-compressible gas), the container 22 is locked (i.e., vent valve 28 operated to a closed position) and the temperature is increased (i.e., heat allowed to return to the container 22) to the liquid temperature of the residual fluid. In one embodiment, heating of the container 22 is provided gradually through normal environmental heat leak. In an alternate embodiment, an accelerated heating process is provided using wall heaters (not shown) provided to the container 22, which typically already exist in, for example, storage containers in connection with which the present invention may be constructed (e.g., propellant, reactant and/or coolant storage containers).

After the venting of the non-condensible gas and increasing the container 22 temperature, the container 22 remains at a low pressure equal to about the vapor pressure of the residual liquid fluid. A fill process may now be performed, with the container 22 provided at a low pressure (i.e., less than 15 psia) and only vapor in the ullage space (i.e., space unoccupied by liquid residual). In operation, the container 22 is filled using a fill system in combination with a fill valve 30. Such a fill system may be provided in any suitable manner according to the requirements of the particular container 22 or system. Fluid (e.g., liquid propellant, reactant and/or coolant) is provided through the fill valve 30 in a known manner. It should be noted that as a result of the low pressure level of the container 22, the pressure used to fill the container 22 is typically between about 20 and 50 psig, thus reducing the amount of pressurant (e.g., helium) needed.

Figure 2:
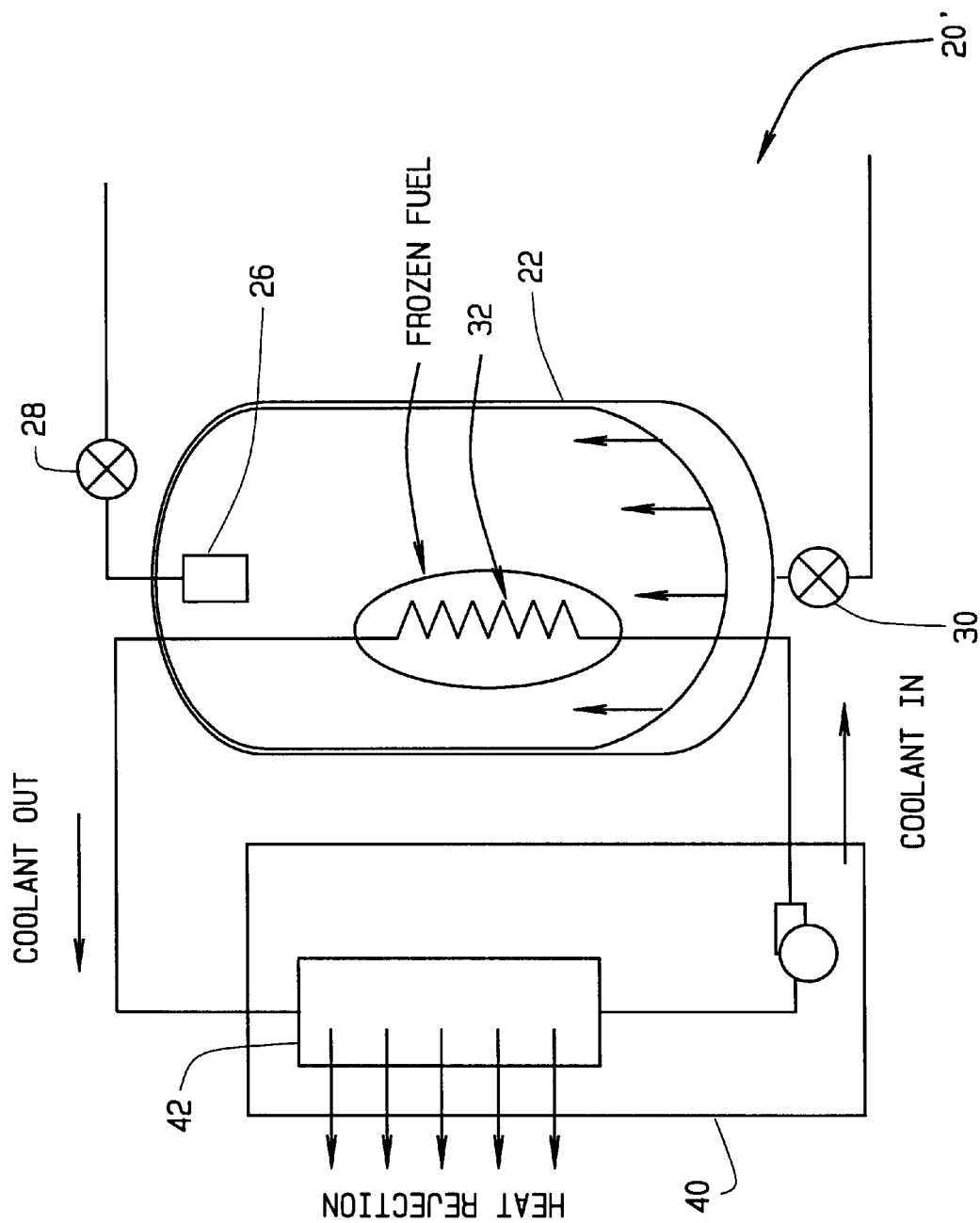
FIG. 2 a schematic diagram of another embodiment of a zero gravity liquid-vapor separation system of the present invention.
Figure 3:
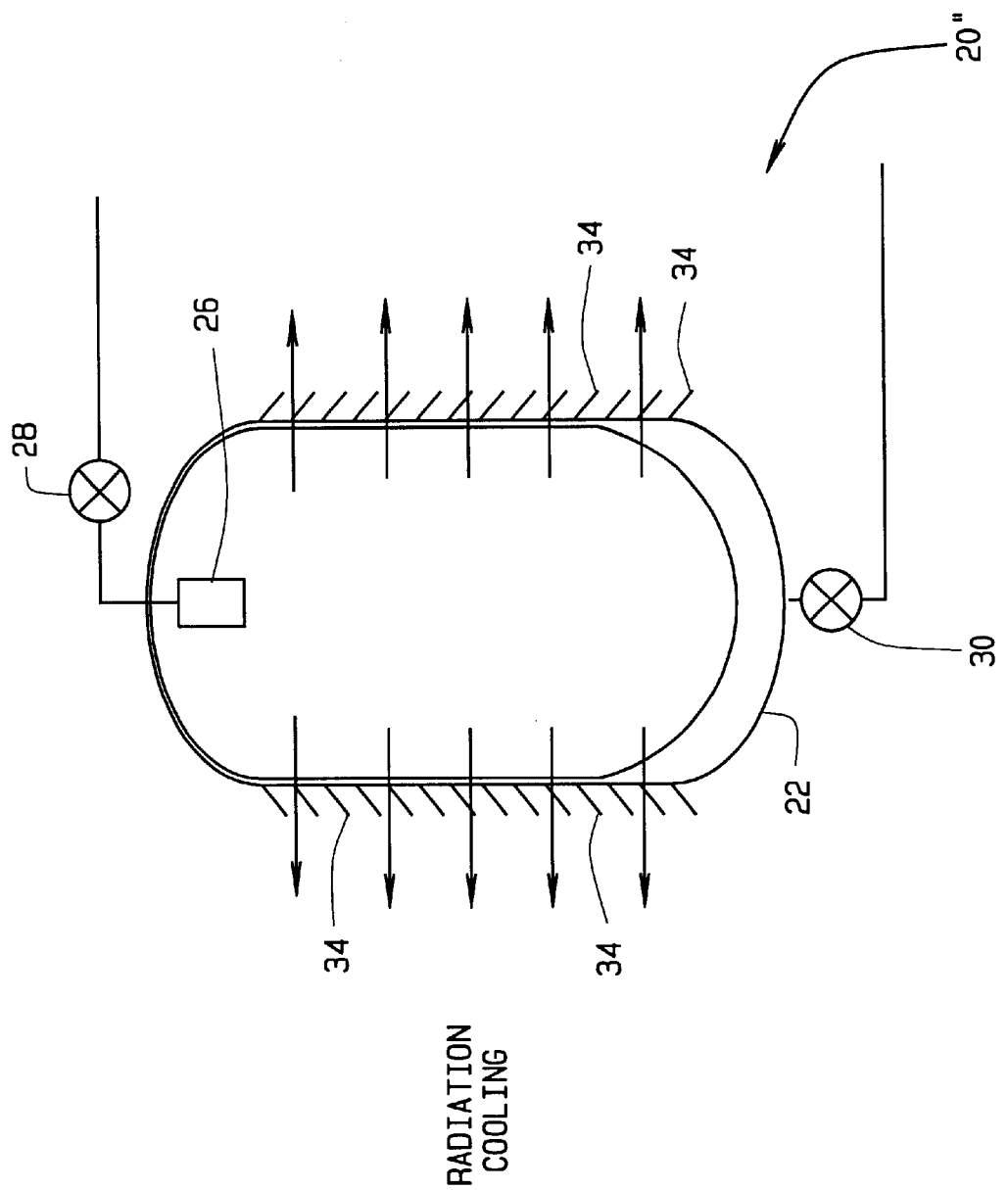
FIG. 3 a schematic diagram a further embodiment of a zero gravity liquid-vapor separation system of the present invention.

With respect to implementing the present invention in connection with a container 22 for use in a zero gravity embodiment, alternate constructions are contemplated. For example, and as shown in FIGS. 2 and 3, different systems for reducing the temperature of the container 22 may be provided. As shown in FIG. 2, a liquid-vapor separation system 20' having an internal heat exchanger 32 comprising may be provided for cooling fluid (e.g., propellant, reactant and/or coolant) within the container 22. As shown in FIG. 3, a liquid-vapor separation system 20" having louver type members 34 on the external wall(s) of the container 22 may be provided.

With respect to the liquid-vapor separation system 20' shown in FIG. 2, in operation, the internal heat exchanger 32 reduces the temperature of gases (e.g., gaseous pressurant) in the container 22, and through heat transfer, indirectly reduces the temperature of the container 22 wall(s) and the temperature of liquid fluid therein. With respect to the liquid-vapor separation system 20" shown in FIG. 3, the louver type heat exchanger having the louver members 34 provides for direct radiation loss of heat to the atmosphere (i.e., space), and thereby lowers the temperature of the container 22 and the liquid fluid therein. It should be noted that the container 22 having louver type members 34 does not require a radiator, recirculating pump and use of a coolant fluid as in the heat exchangers shown in FIGS. 1 and 2. The louver type members 34 essentially provide insulation of the container 22. In operation, the louver type members 34 may be moved to an open position as shown in FIG. 3 to radiate heat and thereby reduce the temperature of the container 22. After the liquid fluid within the container 22 is frozen, the louver type members 34 may be moved to a closed position to provide insulation.

Further, it should be noted that alternate liquids may be used as a coolant, such as, for example, liquid nitrogen, hydrogen, helium, etc. It also should be noted that when using cryogenic fluids, the liquid-vapor separation system 20 may be modified, including, for example, removing the radiator 42, which is no longer needed, as the cryogenic fluid may be vented outside the system after use (i.e., after passing through the cooling lines 46).

Thus, the present invention provides a system and method for transferring propellant in a zero gravity environment to thereby maximize the fill capability of a receiver container. Further, removal of non-compressible gas virtually eliminates any contaminants in the system.

Although the present invention has been described in connection with a specific container having particular component parts for lowering and raising the temperature of the container and the contents therein, it is not so limited, and the present invention may be provided in connection with other containers having different component parts. For example, the type of systems used for venting the container and filling the container may be provided according to the requirements of the specific application or system. Further, cooling and heating of the container may be provided in any suitable manner as required by the particular application or system, including, for example, the configuration of the particular container.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of providing fluid transfer and storage in a zero gravity environment for a container having fluid therein by varying the temperature of the fluid, the method comprising the steps of:

lowering the temperature of the fluid within the container below a freezing point of the fluid;

venting the container to remove non-frozen fluid remaining in the container;

raising the temperature of the fluid within the container to at least a liquid temperature point of the fluid; and filling the container with additional fluid.

2. The method according to claim 1 wherein the fluid is primarily a liquid and the step of lowering the temperature comprises lowering the temperature of the container below the freezing point of the liquid of the fluid.

3. The method according to claim 2 wherein the step of raising the temperature comprises raising the temperature of the container to at least the liquid temperature point of the liquid of the fluid.

4. The method according to claim 1 wherein the step of raising the temperature comprises using external environment temperature to raise the temperature of the fluid.

5. The method according to claim 1 wherein the step of raising the temperature comprises using a heater to raise the temperature of the fluid.

6. The method according to claim 1 wherein the step of venting comprises reducing the pressure level of the container to a zero gravity vacuum.

7. The method according to claim 1 wherein the fluid is a primarily liquid propellant and pressurant is used in combination with the propellant for filling the container, and the step of venting comprises removing from the container non-condensible pressurant.

8. A method of maximizing the fluid storage capability of a container in a zero gravity environment by separating a liquid and a gas part of the fluid, the method comprising the steps of:

lowering the temperature of fluid in the container below the freezing point of the liquid part of the fluid;

venting the container to remove any gas part of the fluid not frozen and remaining in the container; and raising the temperature of the liquid part of the fluid to at least a liquid temperature point of the liquid part of the fluid.

9. The method according to claim 8 further comprising transferring additional fluid to the container after the temperature has been raised.

10. The method according to claim 9 wherein the step of transferring additional fluid to the container comprises diffusing the additional fluid for storage in the container.

11. The method according to claim 8 further comprising using a cooling device to lower the temperature of the fluid within the container.

12. The method according to claim 11 wherein the cooling device is a refrigeration system and further comprising using a refrigerant fluid to lower the temperature of the residual fluid.

13. The method according to claim 8 wherein the step of raising the temperature comprises using a heater to raise the temperature of the container.

14. The method according to claim 8 wherein the step of lowering the temperature comprises lowering the temperature of the gas part within the container to thereby lower the temperature of the fluid part therein.

15. The method according to claim 8 wherein the fluid is primarily a liquid.

16. A zero gravity liquid-vapor separation system for use in storing fluids in a zero gravity environment, the zero-gravity liquid-vapor separation system comprising:

a container for storing a primarily liquid fluid;

a heat exchanger for lowering the temperature of the container below a freezing point of the primarily liquid fluid therein; and a vent for use in removing non-condensible gases within the container when the primarily liquid fluid is below its freezing point, to thereby provide maximize storage capacity for additional fluid.

17. The zero gravity liquid-vapor separation system according to claim 16 further comprising a heater in combination with the container for heating the frozen primarily liquid fluid to a liquid temperature point.

18. The zero gravity liquid-vapor separation system according to claim 16 wherein the heat exchanger comprises a refrigeration system.

19. The zero gravity liquid-vapor separation system according to claim 16 further comprising a diffuser in combination with the vent for use in venting the container.

20. The zero gravity liquid-vapor separation system according to claim 16 further comprising louver type members.

* * * * *